J. M. MURFF.
INSECT DESTROYER.
APPLICATION FILED NOV. 1, 1907.

898,909.

Patented Sept. 15, 1908.
3 SHEETS—SHEET 1.

Witnesses
Louis R. Heinrichs
C. C. Hines

Inventor
Jerry M. Murff
By Victor J. Evans
Attorney

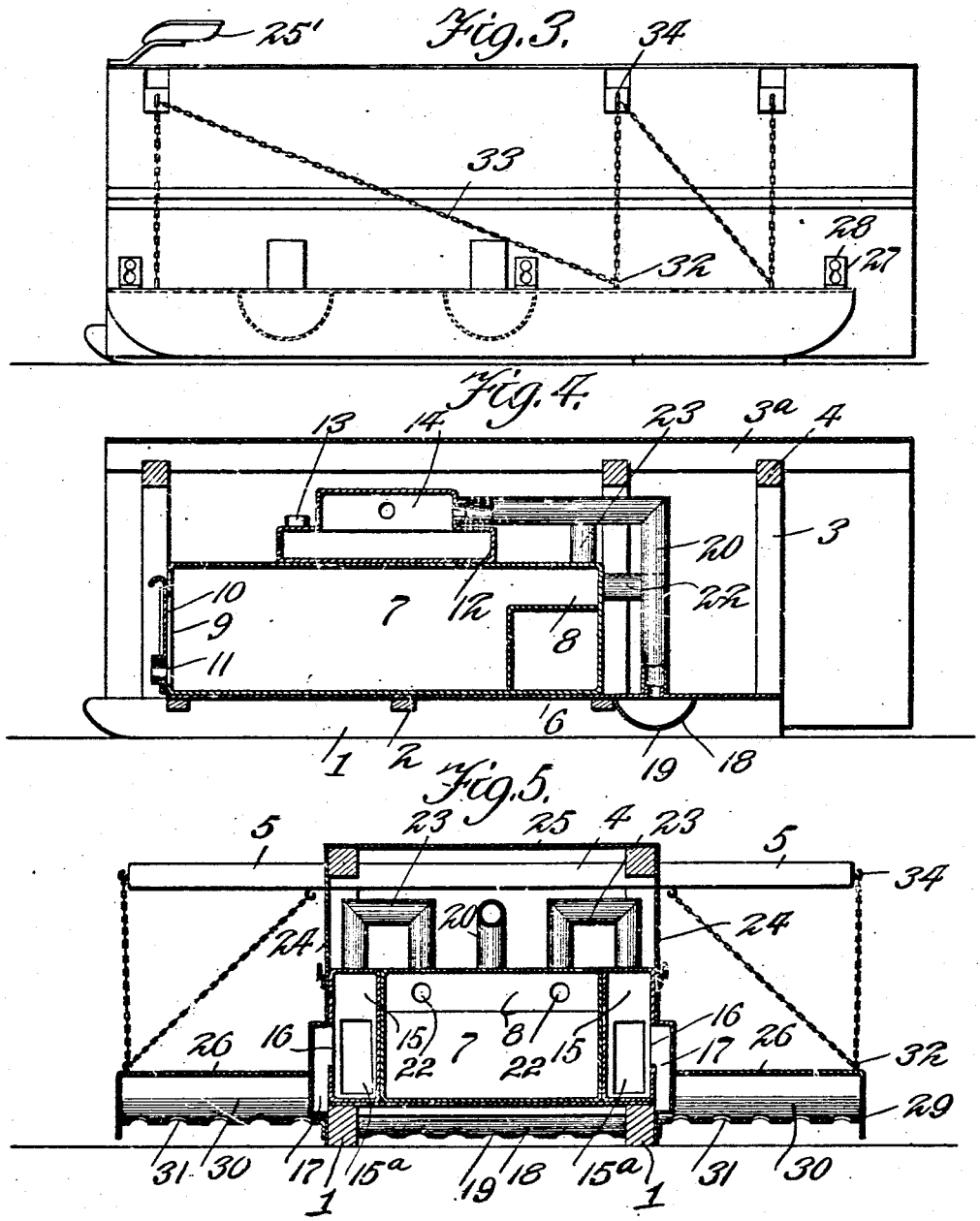

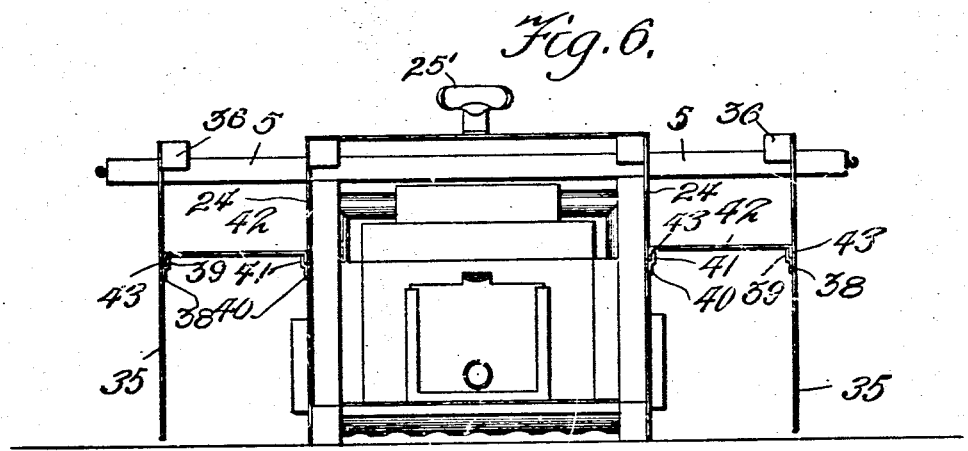
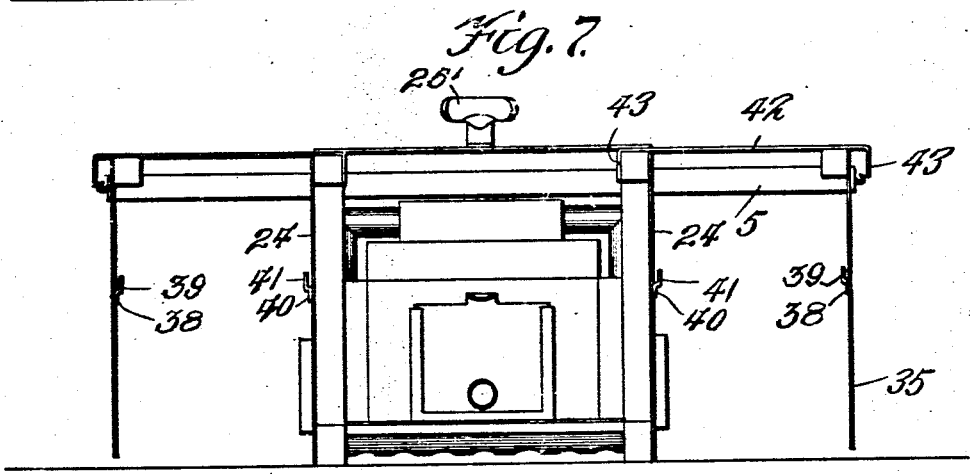
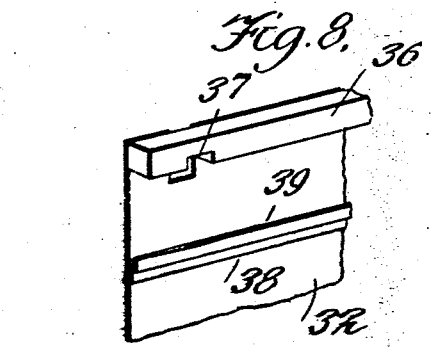
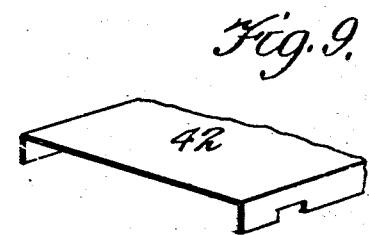

UNITED STATES PATENT OFFICE.

JERRY M. MURFF, OF SWEETWATER, TEXAS.

INSECT-DESTROYER.

No. 898,909.   Specification of Letters Patent.   Patented Sept. 15, 1908.

Application filed November 1, 1907. Serial No. 400,266.

*To all whom it may concern:*

Be it known that I, JERRY M. MURFF, a citizen of the United States, residing at Sweetwater, in the county of Nolan and State of Texas, have invented new and useful Improvements in Insect-Destroyers, of which the following is a specification.

This invention relates to insect destroyers of that type adapted to be drawn across the field and to generate and discharge noxious fumes or vapors destructive to insect life, and designed for destroying boll-weevils, boll worm moths, cotton caterpillars, sharpshooters and other insects injurious to the cotton-plant and other growing plants.

The main object of the invention is to provide a device of this character having a novel construction and arrangement of vapor generating and distributing means, whereby increased efficiency is insured, and also having novel side attachment whereby the apparatus may be adapted to fumigate a plurality of rows of plants at a time.

A further object of the invention is to provide interchangeable side attachments of a character adapting the apparatus for fuming rows of plants varying in height and width.

With these and other objects in view, the invention consists of the features of construction, combination and arrangement of parts hereinafter fully described and claimed, reference being had to the accompanying drawings, in which;—

Figure 1:
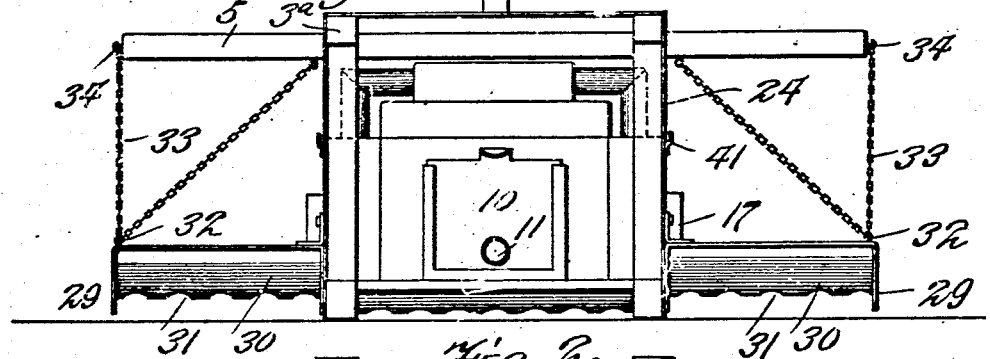
Figure 2:
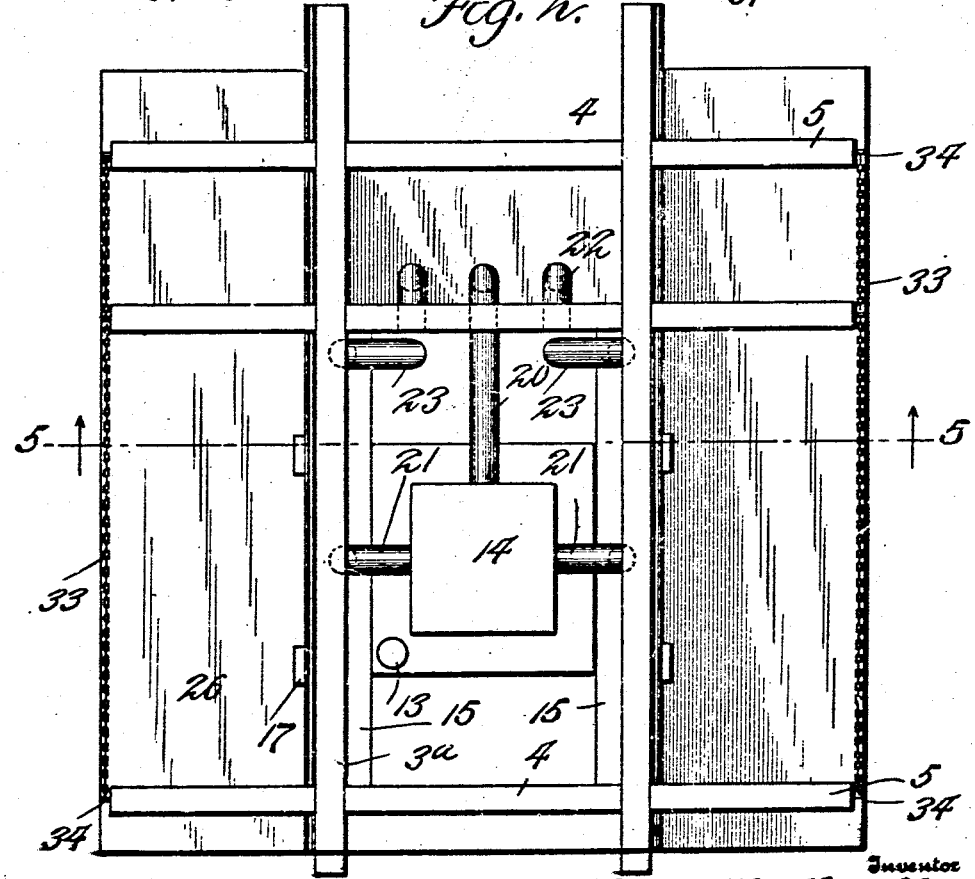

Figure 1 is a front elevation of an insect destroyer embodying my invention. Fig. 2 is a top plan view thereof omitting the cover plate. Fig. 3 is a side elevation. Fig. 4 is a central vertical longitudinal section. Fig. 5 is a vertical transverse section on line 5—5 of Fig. 2. Fig. 6 is a front elevation, showing the use of different side attachments adapted to be interchangeably employed with and in place of those shown in Figs. 1 to 5, inclusive. Fig. 7 is a similar view disclosing a different arrangement of the shield brace from that shown in Fig. 6. Figs. 8 and 9 are fragmentary perspective views of the guards and shield braces shown in Figs. 6 and 7.

In the exemplification of the invention herein shown, a frame is provided comprising a pair of parallel longitudinal bottom bars 1, lower cross bars 2 connecting the same, uprights 3 rising from the bottom bars, and upper longitudinal bars 3ª carried by the uprights, and cross bars 4 connecting the upper ends of the uprights, said bars 4 being extended beyond the sides of the frame to form supporting arms 5, the parts in practice being bolted or otherwise suitably united. The bars 1 serve as runners, forming a sled frame adapted to be drawn over the surface of the ground by one or more draft animals traveling between the rows of plants, but it will be understood that the frame may be mounted on wheels journaled on the bars 1 or axles supported thereby, as circumstances or conveniences may require in the operation of the apparatus.

The bottom portion of the frame supports a platform 6, preferably composed of a metallic plate, on which is mounted a heating chamber or furnace 7 formed of sheet metal and designed to utilize in practice any preferred sort of fuel, said furnace being of less width than the platform and provided at its rear end with an outlet 8 for the hot air and products of combustion. An opening 9 is provided at the front of the furnace for the insertion of the fuel and removal of the ashes and is adapted to be closed by a vertically sliding door 10 having a draft opening 11. If the area of this opening is not sufficient for the admission of air to support combustion to the desired extent, the door may be opened to a greater or less extent for the admission of an increased supply of air.

Mounted upon the top of the sheet metal furnace and adapted to be heated therefrom is a reservoir or receptacle 12 adapted to receive the vaporizable insecticide, which is preferably employed in liquid form. The reservoir is adapted to be filled with the insecticide through an opening covered or closed by a cap 13 and is formed with a contracted dome or top chamber 14 into which the fumes or vapor generated from the heated insecticide pass. Supported upon the platform at opposite sides of the furnace are heating drums or chambers 15 which lie in contact with the sides of the furnace and are heated by radiation therefrom. These drums are provided in their outer sides with discharge ports 16 communicating with the upper ends of downwardly extending discharge tubes or nozzles 17, and each has a rear sliding cleanout door 15ª.

Arranged upon the underside of the platform 6 beyond the rear end of the furnace is a distributer comprising a channeled strip or trough 18 extending transversely between the bars 1 with its bottom located above the surface of the ground and provided with ports 19 for the discharge of the vapor or fumes therefrom. This trough is in communication through an opening in the platform with a vapor supply pipe 20 leading from the rear end of the dome 14, whereby a portion of the fumes or vapors generated in the vaporizer is supplied to said trough. Also leading from the dome laterally in opposite directions are vapor pipes 21 which connect with and conduct the remainder of the fumes or vapor to the drums or heating chambers 15, from which said fumes discharge through the nozzles 17. Pipes 22 and 23 lead respectively from the outlet 8 to the distributer 18 and the drums 15, and serve as draft pipes for the furnace, by which the hot air and products of combustion from the furnace are caused to discharge through the distributer 18 and nozzle 17 and to commingle with and keep the fumes or vapor supplied to these respective ejectors in a highly heated condition, whereby any possibility of condensation thereof is prevented and the products of combustion utilized in connection with the vapors to destroy the insects. Side walls or plates 24 are provided with openings for the extension of the nozzles 17 therethrough and cover the sides of the frame and inclose the furnace, drums and pipes to confine the heat to an appreciable extent. A cover plate or platform 25 is detachably mounted upon the upper longitudinal bars 3ª of the frame and supports a driver's seat 25′.

In the form shown, the furnace and generator are supported low down upon the frame and the distributer 18 and nozzle 17 are arranged to come close to the surface of the soil. With this arrangement, the device as thus far constructed is designed to travel in the space between adjacent rows of plants or over a row of short plants, but, of course, the aforesaid parts of the apparatus may be elevated by mounting them high on the frame or providing the frame with wheels so that the device may straddle and travel along a row of plants of any desired height, it being understood that the vapor discharging from the distributer 18 will circulate in the space between the bars 1 and platform 6 and come in intimate contact with the plants and surface of the ground, thus destroying all the insects in the vicinity thereof. The nozzles 17 are designed to eject and supply the vapor to distributers or side attachments by which the vapor will be confined and brought into contact with adjacent rows of plants for the destruction of insects upon and in the vicinity thereof.

Side attachments of the form shown in Figs. 1 to 5, inclusive, are employed for use in broad-side fuming in ejecting the vapors close to the surface of the ground and in destroying the insects on small plants or garden truck. Each of these side attachments comprises a horizontal plate 26 provided at its inner edge with hanger brackets 27 having key-hole slots for detachable connection with supporting pins or studs 28 on the side plate 24. Said plate 26 is preferably shorter than the plate 24 but may correspond in length therewith, and is formed at its outer edge with a downturned or vertical longitudinal guard flange 29. Two distributers 30 extend transversely beneath the plate 26 and are in the form of gutters or troughs closed at their outer ends by the flange 29 and adapted to communicate at their inner end with the nozzles 17 of the adjacent drum 15 to receive the fumes or vapors issuing therefrom, each trough being provided in its bottom with discharge ports 31. Loops or eyes 32 are provided upon the plate 26 for engagement by a suspending chain or equivalent flexible support 33, the links of which are adapted to engage hooks 34 upon the supporting arms 5 to hold the attachment in operative position and relieve the studs 28 of a large proportion of the supporting strain. Upon unhooking the chain the attachment may be disengaged from the studs for removal when its use is not desired or the interchangeable side attachments hereinafter described are to be used in lieu thereof. In the operation of the apparatus with the attachments of this character, which are employed in fumigating garden and other low plants, the frame embodying the distributer 18 runs between adjoining rows with the side attachments projecting over the latter, the vapor escaping from the distributers 18 and 30 circulating over the inclosed space and destroying all of the insects within the area thereof. Of course, the side attachments may be adapted for support at a higher elevation so as to extend over two rows of plants while the body of the apparatus straddles the intervening row, which is treated by the vapor from the distributer 18; or, in treating high plants, the main frame may straddle a central row while the distributers 30 may discharge the vapor in the spaces between said row and the adjacent side rows. It will be observed that the shield plate 26 of each side attachment confines, within its limits, the vapor from upward movement, while the guard 29 operates similarly against the escape of the vapor laterally, so that the vapor will be inclosed for a period of time and allowed to come intimately in contact with the covered plants before it escapes.

In order to adapt the apparatus to be employed for fumigating comparatively high plants, side attachments of a different type are employed and shown in Figs. 6 and 7 and are adapted to be applied to the sides of the frame in lieu of the attachments before described, the two sets of attachments being interchangeable. In Fig. 6, a vertical guard plate 35 is provided and is secured at its upper edge to a supporting bar 36, the bar and plate being notched, as at 37, to engage and rest upon the arms 5 and be held from movement longitudinally of the frame. A strip 38 extends across the inner face of the plate 35 and is bent to form an upwardly projecting locking flange or hook 39, located upon said plate at any desired distance above the lower edge thereof. A similar strip 40 is secured to each side plate 24 for coöperation with the strip upon the adjacent guard plate and is provided with a similar flange or hook 41, and in connection with said guard plate a horizontal plate 42 is employed and provided with side flanges 43 to interlock with the said hooks 39 and 41. The plate 42 coincides in length with the plate 35, which is equivalent in length or nearly so to the wall 24, and serves as a brace to hold said plate 35 against outward movement. Plates 42 of different widths may be employed to permit the plate 35 to be supported from the arms 5 at greater or less distances from the plate 24 to form an intervening space suited to the width of the row of plants to be inclosed and treated. It will be understood that the vapors discharged from the nozzles 17 flow into the spaces formed by the plates 35 and 42, which confines them temporarily while they are acting upon the inclosed plants. Where plants of great height are to be treated the shield plate 42 may be of a length to extend inwardly and outwardly beyond the arms 5 so that the flanges 43 thereon may engage the adjacent frame bar 3ᵃ and the outer ends of the arm 5 or the hooks 34 thereon as shown in Fig. 7 to hold the guard plate 35 from outward movement off the arm. The function here is the same as that described with reference to Fig. 6, and the operation will accordingly be readily understood.

As stated, the side attachments shown in Figs 1 to 5, inclusive, may be of the arrangement shown to fumigate small plants or disposed higher on the frame to fumigate comparatively large plants, but both types of side attachments are preferably used in order to increase the range of effectiveness of the device and its adaptability to different conditions of service in destroying various kinds of insects injurious to both large and small plants grown in rows or otherwise. It will be seen that the construction described provides an apparatus by which the fumes or vapors generated thereby will be discharged and circulated about the plants and over the surface of the ground in such a manner as to rapidly destroy the insects upon the foliage and ground.

Having thus described the invention, what I claim as new and desire to secure by Letters Patent is:—

1. An insect destroyer comprising a carrier, a heating device thereon, a vapor generator heated from but closed against communication with said heating device, a vapor discharging device communicating with the generator, and means leading from the heating device to the vapor discharging device for commingling the hot air and products of combustion from the heating device with the discharging vapor.

2. An insect destroyer comprising a carrier, a heating device thereon, a vapor generator heated from but closed against communication with said heating device, a vapor discharge device, a vapor supply pipe leading from the vapor generator to the vapor discharge device, and a pipe leading from the heating device to said vapor discharge device for conducting the hot air and products of combustion thereto.

3. An insect destroyer comprising a carrier, a heating device thereon, a vapor generator and drums heated by the heating device, discharge devices connected with the generator and drums, pipe connections between the vaporizer and drums, and means for discharging the hot air and products of combustion from the heating device to commingle with the vapor expelled through said discharge devices.

4. An insect destroyer comprising a carrier, a heating device mounted thereon, heating chambers at the opposite sides of the heating device and heated therefrom, said heating chambers having ejecting nozzles, a vaporizing device arranged to be heated by the heating device, a vapor distributer, and means for conducting the vapor from said vaporizing device to the heating chambers and distributer.

5. An insect destroyer comprising a carrier, a heating device mounted thereon, heating chambers at the opposite sides of the heating device and heated therefrom, said heating chambers having ejecting nozzles, a vaporizing device arranged to be heated by the heating device, a vapor distributer, means for conducting the vapor from said vaporizing device to the heating chambers and distributer, and means for commingling the hot air and products of combustion from the heating device with the discharging vapor.

6. An insect destroyer comprising a carrier, having laterally extending supporting arms, a vapor producer upon the carrier, removable means adapted to be disposed at a side of the carrier for producing a partial cover for the plants to bring the vapor in contact therewith, and means for detachably supporting said means from the supporting arms.

7. An insect destroyer comprising a carrier, vapor producing means thereon having outlets to discharge the vapor at the sides thereof, removable devices adapted to be disposed at the sides of the carrier to form partial covers for the plants into which the vapor is discharged, and means for detachably securing said devices to the carrier.

8. An insect destroyer comprising a carrier, vapor producing means thereon having outlets to discharge the vapor at the sides of the carrier, removable devices adapted to be disposed at the sides of the carrier to form partial housings for the plants and into which the vapor is discharged from said outlets, each of said devices comprising a vertical guard and an upper horizontal shield, and means for detachably securing the same to the carrier.

9. An insect destroyer comprising a carrier, a heating device thereon, a vapor generator mounted upon the heating device, drums disposed at opposite sides of said heating device, said vapor generator and drums being heated from the heating device, a rear transverse distributer, a pipe leading from the vapor generator to said distributer, discharge devices leading from the drums at the sides of the carrier, pipe connections between the vapor generator and the drums, pipe connections between the heater and the drums, for commingling the hot air and products of combustion from the heating device with the vapor therein, and a pipe connection between the heater and the said rear transverse distributer.

10. An insect destroyer comprising a carrier having laterally extending supporting arms, a vapor producer upon the carrier, means for ejecting the vapor therefrom at the sides of the carrier, a housing upon each side of the carrier comprising a horizontal plate and a vertical guard, means for detachably connecting said horizontal plates to the sides of the carrier, and means for detachably supporting the outer edges of the horizontal plates and the guards from the supporting arms.

11. An insect destroyer comprising a carrier, a vapor producer upon the carrier, means for discharging the vapor generated thereby at the opposite sides of the carrier, supports upon the sides of the carrier, arms extending laterally from the carrier above said supports, plant covers adapted for engagement with said supports, and means for detachably supporting said covers from the supporting arms.

12. An insect destroyer comprising a carrier, a vapor producer thereon, supporting arms extending laterally from opposite sides of the carrier, vapor discharge devices communicating with the producer and arranged at opposite sides of the carrier, devices adapted to be arranged at the sides of the carrier for partially covering plants during the fuming process, and means for detachably connecting said devices with the carrier and supporting arms.

In testimony whereof, I affix my signature in presence of two witnesses.

JERRY M. MURFF.

Witnesses:
J. McWHIRTER,
A. L. DAVIS.